United States Patent [19]
Chodos et al.

[11] Patent Number: 5,406,328
[45] Date of Patent: Apr. 11, 1995

[54] ADAPTIVE TRACK LOOP BANDWIDTH REDUCTION IN CLUTTERED SCENES

[75] Inventors: Steven L. Chodos, Los Angeles; Gillian K. Groves, Lawndale; Larisa Stephan, Hawthorne, all of Calif.

[73] Assignee: Hughes Aircraft Company, Los Angeles, Calif.

[21] Appl. No.: 127,836

[22] Filed: Sep. 28, 1993

[51] Int. Cl.6 .............................................. H04N 7/18
[52] U.S. Cl. ...................................... 348/170; 348/169
[58] Field of Search ............... 348/148, 149, 169, 170, 348/171, 172; H04N 7/18

[56] References Cited

U.S. PATENT DOCUMENTS

| | | | |
|---|---|---|---|
| 3,729,582 | 4/1973 | Deye et al. | 348/170 |
| 4,189,747 | 2/1980 | Funari | 348/170 |
| 4,405,940 | 9/1983 | Woolfson et al. | 348/170 |
| 4,796,187 | 1/1989 | North | 348/171 |
| 4,959,714 | 9/1990 | Lo et al. | 348/172 |
| 5,062,056 | 10/1991 | Lo t al. | 348/171 |

Primary Examiner—Howard W. Britton
Assistant Examiner—Richard Lee
Attorney, Agent, or Firm—Hugh P. Gortler; M. W. Sales; W. K. Denson-Low

[57] ABSTRACT

A tracking system and method that achieves system bandwidth reduction and analyzes scene information from an expanded area around a tracked target. Objects in the scene that may interfere with the target and cause degraded tracking performance are tracked to determine the level of likely perturbation of a primary tracker due to interference. The system predicts the time at which interference due to clutter objects will occur and the estimated time duration of the interference. The system uses this information to determine and variably adjust the gains of a track loop to prevent track loss while detecting and tracking maneuvers of the target.

9 Claims, 3 Drawing Sheets

ORIGINAL IMAGE

DETECT CLUTTER OBJECTS (STEP 32)

ASSOCIATE DETECTIONS WITH CLUTTER TRACKS (STEP 34)

UPDATE CLUTTER SIZES AND RATES (STEP 36)

DETERMINE TARGET INTERFERENCE (STEP 37)

ADAPTIVE TRACK LOOP BANDWIDTH REDUCTION IN CLUTTERED SCENES

BACKGROUND

The present invention relates generally to video tracking systems, and more particularly, to an improved video tracking system that employs clutter detection wherein target information and scene objects are used to automatically decrease the system bandwidth to reduce perturbations from clutter during interference.

Conventional video trackers detect clutter on a very local level and enter into a "coast" state by setting the system bandwidth (gain) to zero for a period of time during expected interference, using a previously computed target rate estimate to predict the target position during the time period. Target maneuvers during a coast event may cause the target to be lost irreparably.

Kalman filters and extended Kalman filtering are used in some video tracking systems to automatically change the system bandwidth (gain) according to changes in target position measurements. Typical Kalman filters vary the bandwidth depending on how well the target position measurements match dynamic model predictions. When the match is good, the system bandwidth is reduced, thus, measurements are weighted less. When the match is poor, the system bandwidth is increased and the model parameters are updated for the new measurements. Unless the Kalman filter is augmented for predicted interference, the filter updates the model parameters during the interference period, exactly the opposite of what is desired. Thus, Kalman filters actually increase the system bandwidth during perturbations. Kalman filtering cannot estimate the length of the interference, and must rely on target position measurements alone to drive the system bandwidth back to normal.

Accordingly, it is an objective of the present invention to provide for a video tracking system that overcomes the limitations of conventional tracking systems. It is also an objective to provide for a video tracking system that employs clutter detection wherein target information and scene objects are used to automatically decrease the system bandwidth to reduce perturbations from clutter during interference.

SUMMARY OF THE INVENTION

The present invention provides for a tracking system and method that achieves system bandwidth reduction and analyzes scene (video) information from an expanded area around a tracked target. Objects in the scene that may interfere with the target and cause degraded tracking performance are tracked to determine the level of likely perturbation of a primary tracker due to interference. The present invention predicts the time at which interference due to clutter objects will occur and the estimated time duration of the interference. The present invention uses this information to variably adjust the system bandwidth (gain) of a track loop to prevent track loss while detecting and tracking maneuvers of the target.

More particularly, the present system comprises a clutter detection and target tracking system for processing video signals indicative of a primary target and a clutter object located in the vicinity of the target. The system comprises a primary target tracker for processing the video signals to produce position signals indicative of the position of the primary target within a track gate, and a multi-target tracker for processing the video signals to detect clutter objects and for computing position and velocity data relating thereto relative to the primary target. Prediction means are coupled to the multi-target tracker for processing the position and velocity data to predict interference between the primary target and the clutter object. Frequency computation means are coupled to the prediction means for calculating an open-loop crossover frequency corresponding to the predicted interference. Adjusting means are coupled to the frequency computation means for adjusting track loop gains using the calculated open-loop crossover frequency. A track loop is coupled to the primary target tracker and the adjusting means. The track loop is adapted to process the position signals from the primary target tracker and the adjusted track loop gains to maintain track of the primary target in the presence of the clutter object. The multi-target tracker comprises detection means for detecting a clutter object located outside the track gate, correlating means for correlating the detected clutter object with clutter objects stored in a track file database, and updating means for updating the position and velocity data of the detected clutter object.

The present method generally comprises the following steps. The first step comprises processing applied video signals in a primary target tracker to generate a position signal indicative of the position of the target in a track gate. The video signals are processed in a multi-target tracker wherein objects outside the track gate are detected. An open-loop crossover frequency is calculated below which tracking of the target will not be lost. Track loop gains are updated using the calculated open-loop crossover frequency. The position signal indicative of the position of the target and the updated track loop gains are then processed in a track loop that maintain track of the primary target in the presence of the clutter object.

The present invention is superior to coasting methods for two reasons. First, the system bandwidth is decreased only to the level required for the particular threat, which allows for target maneuvers to be detected, and second, the length of time the interference will be present is estimated, so that the system bandwidth is reduced only as long as necessary. The present invention is an improvement over unaugmented Kalman filtering because target information and scene objects are used to automatically decrease the system bandwidth to reduce perturbations from clutter during interference with the target.

The present invention thus provides a tracking system having a relatively large field of view that permits better tracking of potential clutter objects when compared to conventional trackers. The present invention also allows target maneuvers to be detected during the interference period between the clutter and the target. The present invention discriminates between those objects likely to cause track interference and objects unlikely to cause such interference. The present invention may be incorporated in video trackers having programmable features, and may be employed with either closed-loop or in-raster video trackers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

By way of introduction, although track gates used by conventional imaging target trackers provide a measure of clutter resistance, they only provide notice of impending interference within a few frames of the onset of the interference. In addition, simple detection of an object intruding into a track gate does not provide information about the size of the object or the duration of its interference with a target.

In general, there are two types of tracking. With regard to in-raster tracking, the target is tracked within the video raster, and the line-of-sight of a video sensor that views the target may or may not move. The second type of tracking is closed-loop tracking where the line-of-sight of the sensor is commanded to follow the target. The present invention may be employed with either type of tracking system. In the present invention, two trackers operate at the same time, wherein one follows the target of interest and the second "keeps track" of all other objects moving in the field of view of the sensor relative to the target that may interfere with the target. The second type of tracking is sometimes referred to as multi-target tracking and is well-known to those skilled in the art.

For the purposes of the present invention, clutter is any object or scene phenomenon that can perturb target measurements. The present invention may be used for multi-target tracking, in which case each target may be a clutter with respect to all other targets. The present invention may be applied to closed-loop and in-raster track loops, although the present invention is described below with reference to an in-raster track loop. Also, and without loss of generality it is assumed that clutter objects are stationary so that the velocity (rate) of the target is also a relative rate between the clutter and the target.

Figure 1:
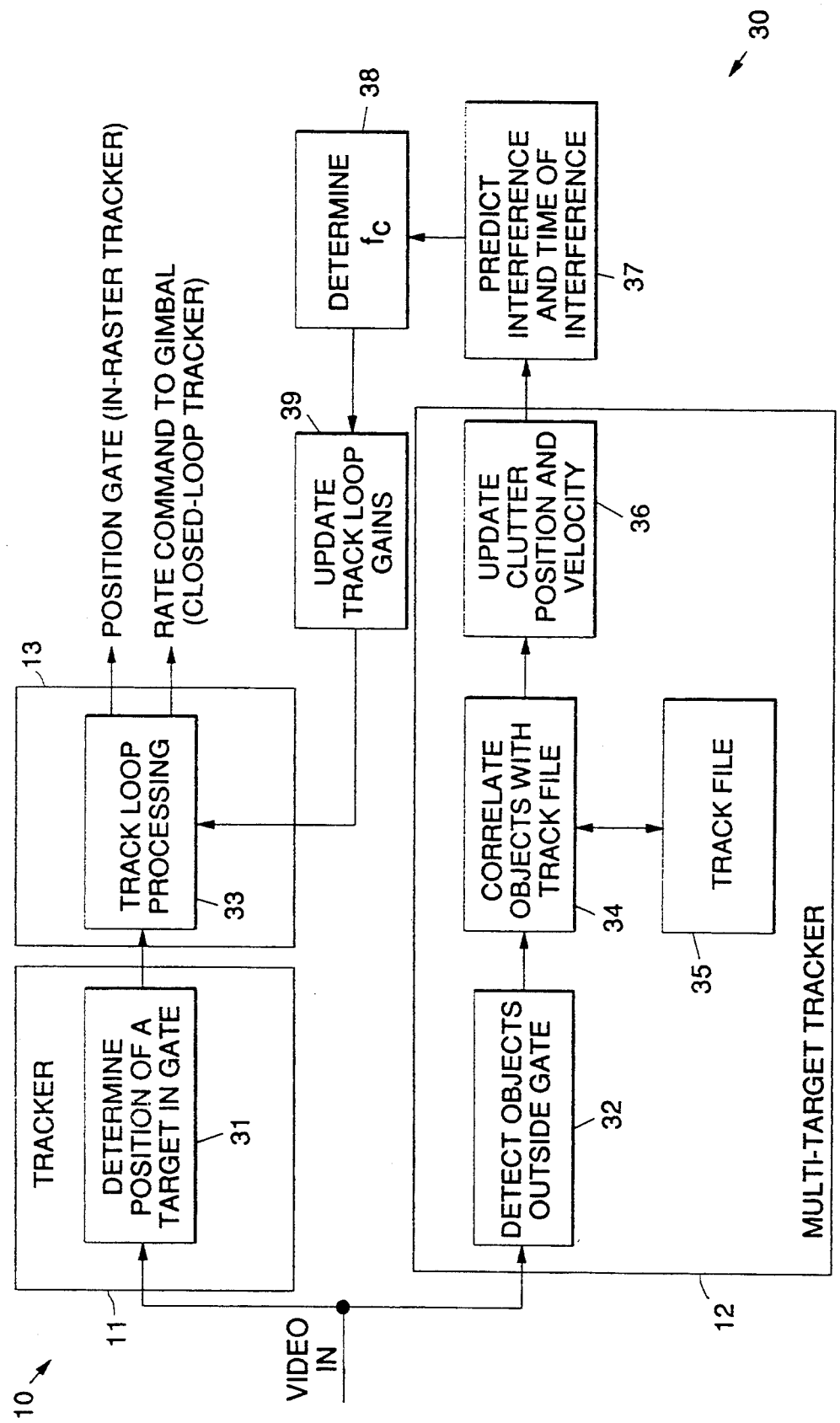
FIG. 1 is a block diagram illustrating a clutter detection and target tracking system and method in accordance with the principles of the present invention.

Referring to the drawing figures, FIG. 1 is a block diagram illustrating a clutter detection and target tracking system 10 and method 30 in accordance with the principles of the present invention. The clutter detection and target tracking system 10 is comprised of a primary target tracker 11, and a multi-target tracker 12. The multi-target tracker 12 is adapted to detect clutter objects 28 (shown in FIG. 3) and provide position and velocity data relating to each clutter object 28. The multi-target tracker 12 is comprised of several processing algorithms including a detection algorithm 32, a correlation algorithm 34 that is coupled to a track file 35 containing data relating to the tracked clutter objects 28, and an updating algorithm 36 that is adapted to update the position and velocity data for each clutter object 28 that is detected. The clutter and velocity data is coupled to additional processing algorithms that provide for further processing. A prediction algorithm 37 is used to process the clutter and velocity data to predict interference between a primary target 27 and the clutter object 28. The output of the prediction algorithm 37 is processed by a crossover frequency algorithm 38 to determine the open-loop crossover frequency, $f_c$ (or bandwidth) relating to the interference. Track loop gains for a track loop 13 are then updated by an updating algorithm 39 using the calculated open-loop crossover frequency. The target position data generated by the primary target tracker 11 and the updated track loop gains are processed by the track loop 13 to produce either a position gate for an in-raster tracker or a rate command for a gimbal in a closed loop tracker.

The present method 30 also illustrated in FIG. 1 comprises the following steps. Video signals are applied to the primary target tracker 11 and the position of the target 27 in a track gate 29 (shown in FIG. 3) is determined (step 31 ). The video signals are also applied to the multi-target tracker 12 wherein objects 28 outside the track gate 29 are also detected (step 32). Within the multi-target tracker 12 objects 28 detected outside the track gate 29 are correlated (step 34) with objects contained in the track file database 35. The position and velocity of the clutter objects 28 are updated (step 36). Then the amount of interference and time of interference between the target 27 and each object 28 is predicted (step 37). The open-loop crossover frequency, $f_c$ is then determined (step 38). Track loop gains are then updated (step 39) using the calculated open-loop crossover frequency. Then the target position from (step 31 and the updated track loop gains are processed (step 39) by the track loop 13 to produce either a position gate for an in-raster tracker or a rate command for a gimbal in a closed loop tracker.

Figure 2:
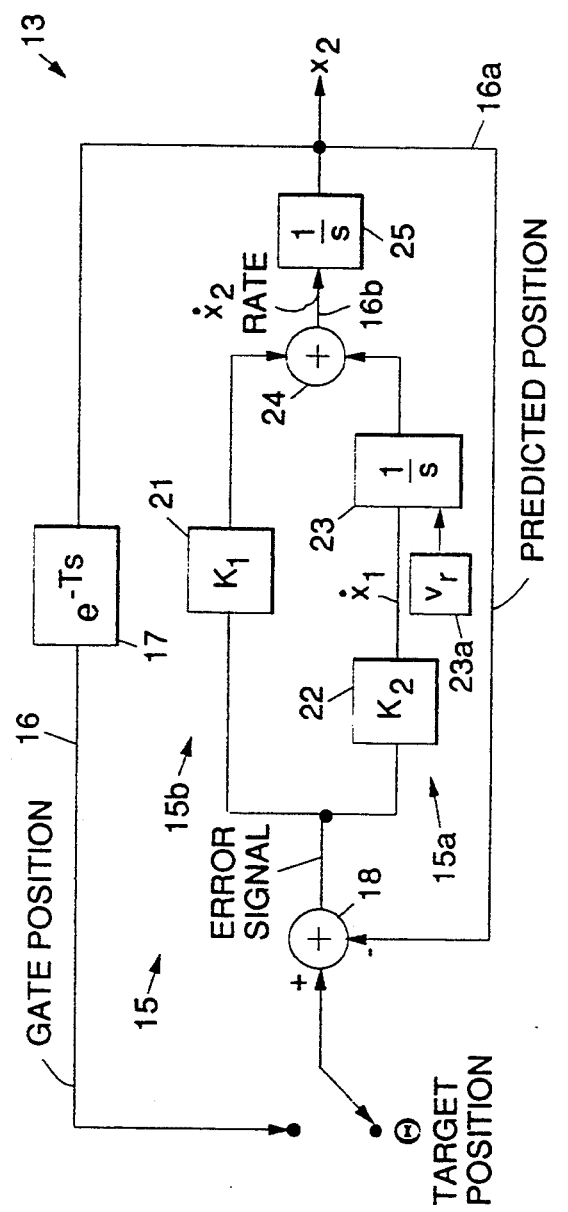
FIG. 2 is a diagram of an in-raster track loop that may be employed in the tracking system of FIG. 1.

FIG. 2 is a diagram of an in-raster track loop 13 that may be employed in the system 10 of FIG. 1. Specifically, FIG. 2 shows a Type II integral-plus-proportional control in-raster track loop 13 that drives a track gate position and target state estimate 15. A track gate position signal 16 experiences a nonlinear hysteresis and rounding operation: for ease of analysis, this is approximated as a time delay 17 ($e^{-Ts}$). This time delay 17 represents the time required for the position of the primary target 27 to change enough so that the track gate 29 moves one pixel. This delay 17 is inversely proportional to the speed of the primary target 27. During normal operation, the primary target 27 is contained entirely within the track gate 29 and the exact placement of the track gate 29 relative to the primary target 27 does not affect either the position measurement or the predicted position, comprising a predicted position signal 16a. The track loop 13 includes two summing devices 18, 24 that are employed to obtain desired terms, and comprises an upper path 15b that includes a first gain term 21 ($K_1$) that is coupled between the two summing devices 18, 24, and a lower path 15a provided for normal operation that includes a second gain term 22 ($K_2$), and a first integrator 23 that is coupled between the two summing devices 18, 24. An initial value for the first integrator 23a is provided. The output of the second summing device 24 provides a predicted rate signal 16b corresponding to $x_2$, and is coupled through a second integrator (1/s) 25 to produce the predicted target position signal 16a.

Figure 3A:
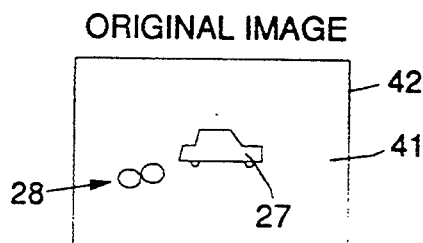
FIG. 3 shows operation of the tracking system and method of the present invention.
Figure 3B:
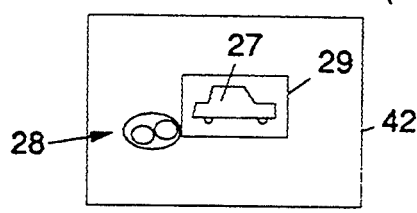
Figure 3C:
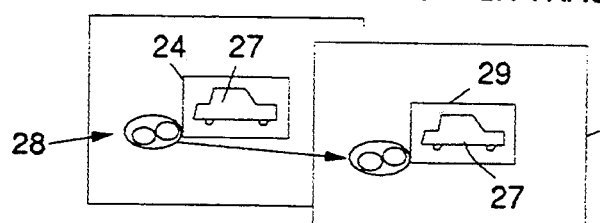
Figure 3D:
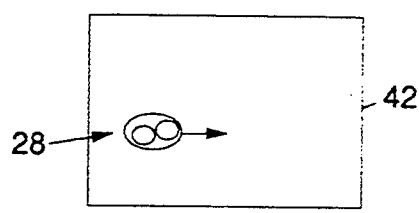
Figure 3E:
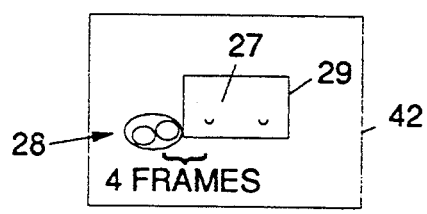
Figure 3F:
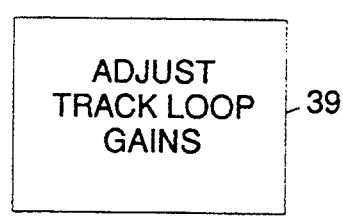

FIG. 3, comprising FIGS. 3a–3f, shows operation of the tracking system 10 and method 30 using the in-raster track loop 13 shown in FIG. 2. FIG. 3a shows a typical image 41 derived from the tracking system 10 that includes the target 27, and two interfering objects 28 or clutter 28. FIG. 3b shows the track gate 29 that is used by the system 10 and method 30 of the present invention to track the primary target 27. The incoming video data derived from a sensor (not shown) is sent to the tracking system 10, such as is provided by a gated video tracker, for example. The target 27 is tracked using centroid or correlation track algorithms, for example, by the primary target tracker 11. The video data is also sent to the multi-target tracker 12. In the multi-target tracker 12, the objects are detected (step 32) shown in FIG. 3b, correlated with the track file database 35 (step 34) shown in FIG. 3c, where new objects 28 are entered into the database 35, old objects 28 are updated and objects 28 that have left the field of view are removed. Positions, sizes and rates of the clutter 28 are then determined (step 36), shown in FIG. 3d. The amount of target interference is then determined (step 37), shown in FIG. 3e. After computation of the open-loop crossover frequency (step 38), the track loop gains are adjusted (step 39), shown in FIG. 3f. The track loop 13 is then closed around the target 27, and the track loop 13 positions the track gate 29, or causes a gimbal to move, depending upon the type of tracking system 10.

The present invention thus provides for a clutter detection and target tracking system 10 having a field of view 42 significantly larger than its track gate 29 and that develops tracks on clutter objects 28 before they enter the track gate 29.

The differential equations describing normal operation of the track loop 13 (represented by the lower path 15a in FIG. 2) are:

$$x_1(t) = K_2[\Theta(t) - x_2(t)]$$

$$x_2(t) = K_1[\Theta(t) - x_2(t)] + x_1(t), \quad (1)$$

where $x_2$ is predicted position 16a of the target 27; t is time; $\Theta$ is position of the target 27. The values of $K_1$ 21 and $K_2$ 22 are proportional and integral loop gains, which are functions of an open-loop crossover frequency, $f_c$. In the present invention $K_a = K_2$ and a 75 degree phase margin at crossover is employed, yielding $$K_1 = 6f_c$$

$$K_2 = 11f_c^2. \quad (2)$$

When the target 27 and clutter 28 fill the entire track gate 29, the input to the track loop 13 is no longer a meaningful target position measurement but is instead simply the center of the track gate 29. In this instance the loop input corresponds to the track gate position signal 16 in FIG. 2. The differential equations for the system 10 are then:

$$x_1(t) = K_2[x_2(t-T) - x_2(t)]$$

$$x_2(t) = K_1[x_2(t-T) - x_2(t)] + x_1 \quad (3)$$

where T, the delay time, is assumed to be inversely proportional to the speed of the target 27, and t is the time since the gate 29 is filled by the target 27 and clutter object 28. The integrator 23 in the lower ($x_1$) path 15a contains the value of a velocity vector, $v_r$ at $t=0$, and wherein an initial value of 0 is assumed for $x_2$.

To obtain closed-form expressions for the predicted rate and position signals 16b, 16a, a Laplace transform is performed:

$$\begin{bmatrix} sx_1 \\ sx_2 \end{bmatrix} = \begin{bmatrix} 0 & K_2(e^{-Ts} - 1) \\ 1 & K_1(e^{-Ts} - 1) \end{bmatrix} \begin{bmatrix} x_1 \\ x_2 \end{bmatrix} + \begin{bmatrix} v_r \\ 0 \end{bmatrix}, \quad (4)$$

the exponential is expanded and the equation is solved:

$$x_1(t) = v_r e^{-t \frac{K_2 T}{1 + K_1 T}} \quad (5)$$

$$x_2(t) = \frac{v_r}{K_2 T} \left( 1 - e^{-t \frac{K_2 T}{1 + K_1 T}} \right). \quad (6)$$

If the interference from the clutter 28 persists long enough, Equation (5) shows that the gate 29 will eventually stop on the clutter 28 since the predicted rate converges to zero. Taking the limit of Equation (6), the gate 29 comes to rest at the position, $$\lim_{t \to \infty} x_2(t) = \frac{v_r}{K_2 T}.$$

The tracking system 10 resumes tracking the target 27 after the interference due to the clutter 28 has passed if the target 27 subtends at least half the track gate 29. That is, if at the time when the clutter 28 ceases to interfere with the target 27, the track gate 29 is centered target-ward from the point where clutter 28 and target 27 finally diverge.

Formally, if N, (resp. NC) is the size of the target 27 (resp. clutter 28) in the direction parallel to the velocity vector, $v_r$, then the target 27 and clutter object 28 will no longer overlap at time t=Nc/r, where r=$|v_r|$. In order for the tracking system 10 not to lose lock, it is necessary that $$x_2\left(\frac{N_c}{r}\right) \geq N_c - \frac{N_t}{2}.$$

Expanding, tracking continues exactly when $$\frac{r^2}{11f_c^2}\left[1 - e^{\frac{-11Ncfc2}{r(r+6fc)}}\right] \geq N_c - \frac{N_t}{2}. \quad (7)$$

The present invention uses this information to prevent clutter-induced loss of lock.

The tracking system 10 thus provides a means for observing and associating clutter 28 that resemble the target 27 according to the discriminants used by the tracking system 10. For instance, a system using a centroid tracker may threshold the input scene to extract objects 28 with the same contrast as the primary target 27. Once detected, clutter objects 28 are associated over multiple cycles to establish rates. Clutter object locations, rates, and detection histories are called clutter tracks and are collectively referred to as the clutter track file database 35.

The present invention provides an interface between the multi-target tracker 12 and the primary target tracker 1 1 as is shown in FIG. 1. The present invention uses the track file database 35 of clutter objects 28 to predict the start time and duration of clutter-to-target interference, and adjusts the track loop gains (K₁ 21 and K₂ 22) in the primary target tracker 11 in proportional to the threat to track integrity presented by approaching objects 28.

The first portion of the present method 30 comprises interference prediction. Let $C_1 \ldots C_M$ be the clutter objects 28 in the track file database 35 that have persisted long enough to be declared "mature" or "valid." Let $P_i$ and $G_i$ be center and gate positions of clutter object 28 ($C_i$), while P and G are centroid and gate positions of the target 27, respectively. Let $v_r$ be the velocity of clutter object 28 ($C_i$) with respect to the target 27, and $r_i = |v_r|$. Approximate both target 27 and clutter objects 28 by circles circumscribed about their gates 23. This yields radii of R and $R_i$ for the target 27 and clutter object 28 ($C_i$), respectively. Collision between the circles approximating the target 27 and clutter object 28 ($C_i$) is possible whenever the equation $$r_i^2 \tau^2 + 2v_{ri}(P-P_i)\tau + |P-P_i|^2 - (R-R_i)^2 = 0 \tag{8}$$

has real solutions for $\tau$. Equation (8) corresponds to step 37 of the present method 30.

If the circle approximation to clutter object 28 ($C_i$) is good, the solutions to Equation (8) are used as the start and end times of the interference between the clutter object 28 ($C_i$) and the target 27. When the approximation is bad, which is declared when a lesser dimension of the gate position $G_i$ is less than $\frac{2}{3} R_i$, the clutter object 28 ($C_i$) is represented by its track gate $G_i$ and the minimum and maximum times are found when any edges of the gate position $G_i$ intersect the circle approximating the target 27. Let $D_i$ be the duration of interference between the clutter object 28 ($C_i$) and the target 27, or zero if no interference will occur.

System bandwidth reduction is the second portion of the present method 30. Using the approximate radii R and $R_i$ for the sizes of the target 27 and the clutter object 28 ($C_i$) in the direction of $v_{ri}$, inequality (7) is rewritten to find that tracking continues after interference from the clutter object 28 ($C_i$) when $$\frac{v^2}{11f_c^2}\left[1 - e^{\frac{-11R_if_c2}{r_i(r_i+6f_c)}}\right] \geq R_i - \frac{R}{2}. \tag{9}$$

Equation (9) corresponds to step 38 of the present method 30. Breaklock due to interference from the clutter object 28 ($C_i$) is averted by selecting an open-loop crossover frequency $f_{ci}$, so that the two sides of inequality (9) are equal.

In the field of M clutter objects 28 simultaneously intersecting the path of the target 27, the desired open-loop crossover frequency is the smallest of the solutions necessitated by each of the clutter objects 28, that is $$f_c = \min_i f_{ci}. \tag{9}$$

Breaklock due to interference from clutter 28 is averted when the open-loop crossover frequency is lowered to the value specified in Equation (10) for D cycles, where $$D = \max_i D_i. \tag{10}$$

Thus there has been described a new and improved video tracking system employing clutter detection wherein target information and scene objects are used to automatically decrease the system bandwidth to reduce perturbations from clutter during interference. It is to be understood that the above-described embodiment is merely illustrative of some of the many specific embodiments which represent applications of the principles of the present invention. Clearly, numerous and other arrangements can be readily devised by those skilled in the an without departing from the scope of the invention.

What is claimed is:

1. A clutter detection and target tracking system for processing video signals said system comprising:
    a primary target tracker for processing the video signals to produce position signals indicative of a position of a primary target within a track gate;
    a multi-target tracker for processing the video signals to detect clutter objects and for computing position and velocity data relating thereto relative to the primary target;
    prediction means for processing the position and velocity data to predict interference between the primary target and a clutter object;
    frequency computation means for calculating an open-loop crossover frequency, $f_c$ corresponding to the predicted interference;
    adjusting means for adjusting track loop gains using the calculated open-loop crossover frequency; and
    a track loop for processing the position signals from the primary target tracker and the track loop gains adjusted by the adjusting means to maintain track of the primary target in the presence of the clutter object.

2. The system of claim 1 wherein the multi-target tracker comprises:
    means for detecting the clutter objects located outside the track gate;
    means for correlating the detected clutter objects with clutter objects storm in a track file database; and
    means for updating the position and velocity data of the detected clutter object.

3. The system of claim 1 wherein the primary target tracker is an in-raster target tracker, and wherein the track loop generates a position gate for the in-raster target tracker.

4. The system of claim 1 wherein the primary target tracker is a closed loop target tracker, and wherein the track loop generates a rate command for a gimbal in the closed loop target tracker.

5. A method for use with a target tracking system that reduces perturbations from clutter objects during interference between the clutter objects and a primary target, said method comprising the steps of:
    processing video signals in a primary target tracker to generate a position signal indicative of the position of the target in a track gate;
    processing the video signals in a multi-target tracker wherein objects outside the track gate are detected;
    calculating an open-loop crossover frequency below which tracking of the target will not be lost;

updating track loop gains using the calculated open-loop crossover frequency;

processing the position signal indicative of the position of the target and the updated track loop gains in a track loop that maintain track of the primary target in the presence of a clutter object.

6. The method of claim 5 wherein the step of processing the video signals in the multi-target tracker comprises the steps of:

correlating the objects detected outside the track gate with clutter objects contained in a track file database;

updating the position and velocity of the objects; and predicting an amount of interference and a time of interference between the target and the object.

7. The method of claim 5 wherein the step of processing in the track loop includes the step of generating a position gate for an in-raster primary target tracker.

8. The method of claim 5 wherein the step of processing in the track loop includes the step of generating a rate command for a gimbal in a closed loop primary target tracker.

9. Apparatus for adjusting track loop gains of a tracking system that can detect a primary target and at least one clutter object, said apparatus comprising:

prediction means for predicting interference between the primary target and the least one clutter object;

frequency computation means for calculating an open-loop crossover frequency corresponding to the predicted interference; and adjusting means for adjusting the track loop gains using the crossover frequency such that bandwidth of the tracking system is reduced during the predicted interference.

* * * * *